(12) United States Patent
Baraga et al.

(10) Patent No.: US 9,689,434 B2
(45) Date of Patent: Jun. 27, 2017

(54) HYDRAULIC CONTROLLER FOR AN AUTOMATIC TRANSMISSION OF A MOTOR VEHICLE

(75) Inventors: Michael Baraga, Stuttgart (DE); Markus Brandenburg, Esslingen (DE); Henrik Kalczynski, Stuttgart (DE); Thomas Kull, Waiblingen (DE)

(73) Assignee: Daimler AG, Stuttgart (DE)

( * ) Notice: Subject to any disclaimer, the term of this patent is extended or adjusted under 35 U.S.C. 154(b) by 370 days.

(21) Appl. No.: 14/236,657

(22) PCT Filed: Jul. 17, 2012

(86) PCT No.: PCT/EP2012/002996
§ 371 (c)(1),
(2), (4) Date: Feb. 3, 2014

(87) PCT Pub. No.: WO2013/017201
PCT Pub. Date: Feb. 7, 2013

(65) Prior Publication Data
US 2014/0157766 A1    Jun. 12, 2014

(30) Foreign Application Priority Data

Aug. 4, 2011  (DE) .................. 10 2011 109 376

(51) Int. Cl.
*F16H 61/02*   (2006.01)
*F16D 1/10*    (2006.01)
(Continued)

(52) U.S. Cl.
CPC ............ *F16D 1/10* (2013.01); *F16D 43/284* (2013.01); *F16D 48/02* (2013.01);
(Continued)

(58) Field of Classification Search
CPC .................................................. F16H 61/0206
See application file for complete search history.

(56) References Cited

U.S. PATENT DOCUMENTS 7,621,836 B2 *  11/2009  Lim .................... F16H 3/66
                                                  475/123
7,703,478 B2    4/2010   Steinborn et al.
(Continued)

FOREIGN PATENT DOCUMENTS

DE   10 2004 006 683 A1   9/2005
DE   10 2004 012 117 A1   9/2005
(Continued)

OTHER PUBLICATIONS

English translation of Japanese Office Action dated Jan. 21, 2015 (two (2) pages).
(Continued)

*Primary Examiner* — F. Daniel Lopez
(74) *Attorney, Agent, or Firm* — Crowell & Moring LLP

(57) ABSTRACT

A hydraulic controller for an automatic transmission of a motor vehicle includes at least one gear shift piston-cylinder unit having a gear shift piston for actuating a shifting element in the form of a multi-plate clutch, and a gear shift pressure chamber in which an actuating pressure may be built up by supplying operating fluid. The gear shift piston-cylinder unit has a centrifugal oil chamber that is separated from the gear shift pressure chamber by a gear shift piston. Operating fluid may be supplied to the centrifugal oil chamber via a centrifugal oil line supplied by a first supply line. The hydraulic controller has a second supply line for supplying operating fluid to the centrifugal oil line. The second supply line may be closed and opened by a centrifugal oil valve.

6 Claims, 1 Drawing Sheet

(51) Int. Cl.
   *F16D 43/284*   (2006.01)
   *F16D 48/02*   (2006.01)
   *F16H 61/686*   (2006.01)

(52) U.S. Cl.
   CPC . *F16H 61/0206* (2013.01); *F16D 2048/0281* (2013.01); *F16D 2048/0293* (2013.01); *F16H 61/686* (2013.01); *F16H 2061/0209* (2013.01)

(56) References Cited

U.S. PATENT DOCUMENTS

| | | |
|---|---|---|
| 8,425,370 B2 | 4/2013 | Leesch et al. |
| 2008/0236980 A1 | 10/2008 | Kemmner et al. |
| 2010/0051408 A1* | 3/2010 | Ulbricht .............. F16H 61/0021 192/85.63 |
| 2010/0222173 A1 | 9/2010 | Diosi et al. |
| 2011/0118080 A1 | 5/2011 | Sowards et al. |

FOREIGN PATENT DOCUMENTS

| | | |
|---|---|---|
| DE | 10 2005 031 066 A1 | 2/2007 |
| DE | 10 2008 055 626 A1 | 5/2010 |
| DE | 10 2010 051 223 A1 | 6/2011 |
| JP | 11-325117 A | 11/1999 |

OTHER PUBLICATIONS

International Search Report dated Oct. 22, 2012 with English translation (five (5) pages).
German language Written Opinion (PCT/ISA/237) dated Oct. 22, 2012 (six (6) pages).
German-language European Office Action dated Oct. 30, 2014 (five (5) pages).

* cited by examiner

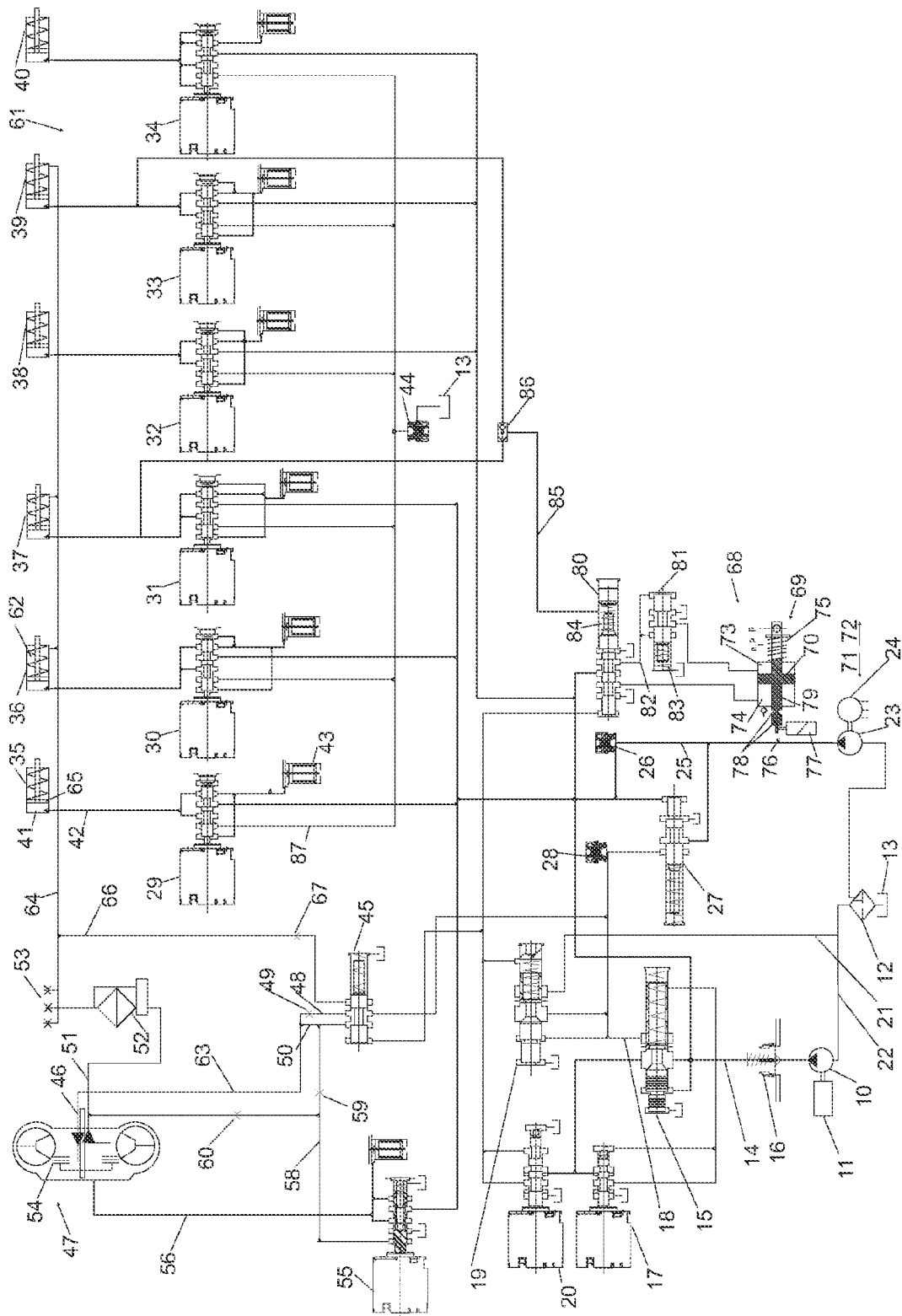

HYDRAULIC CONTROLLER FOR AN AUTOMATIC TRANSMISSION OF A MOTOR VEHICLE

BACKGROUND AND SUMMARY OF THE INVENTION

The invention relates to a hydraulic controller for an automatic transmission of a motor vehicle.

German patent document DE 10 2005 031 066 A1 describes an automatic transmission having a hydraulic controller for a motor vehicle. The automatic transmission has a gear shifting system for shifting an engaged gear of the automatic transmission, the gear shifting system includes at least one gear shift piston-cylinder unit with a gear shift piston for actuating a shifting element in the form of a multi-plate clutch, and a gear shift pressure chamber in which an actuating pressure may be built up by supplying operating fluid. In addition, the gear shift piston-cylinder unit has a centrifugal oil chamber, in the form of a pressure compensation chamber, which is separated from the gear shift pressure chamber by the gear shift piston. The centrifugal oil chamber may be supplied with operating fluid via a centrifugal oil line which is provided by a first supply line.

In a rotating pressure chamber, centrifugal forces act on the operating fluid present therein and cause a pressure rise in the pressure chamber. The pressure rise is thus a function of the rotational speed at which the pressure chamber rotates. The effective pressure in the pressure chamber is therefore greater than the controlled, and thus intended, pressure. If operating fluid is likewise present in a centrifugal oil chamber located on the opposite side of the piston with respect to the pressure chamber, centrifugal forces act on this operating fluid, likewise resulting in a pressure rise at that location. Since the pressure chamber and the centrifugal oil chamber rotate at the same rotational speed, the pressure rise in the pressure chamber and in the centrifugal oil chamber is the same, so that they cancel one another out. When the centrifugal oil compensation is functioning, the controlled pressure thus agrees very well with the actual pressure in the pressure chamber, thus allowing precise control of the shifting element. If the centrifugal oil compensation is not functioning properly, in particular due to insufficient operating fluid in the centrifugal oil chamber, the actual pressure in the pressure chamber is greater than the controlled pressure. The shifting element may then possibly transmit a higher torque than desired, which may result in uncomfortable shifting. As the result of improperly functioning centrifugal oil compensation, the shifting element may unintentionally automatically engage, at least partially, due to the pressure rise in the pressure chamber.

Accordingly, exemplary embodiments of the present invention are directed to a hydraulic controller for an automatic transmission of a motor vehicle in which the shifting elements are precisely controllable.

According to exemplary embodiments of the invention, the hydraulic controller has a second supply line for supplying operating fluid to the centrifugal oil line, and thus to the centrifugal oil chamber. The second supply line may be closed and opened by means of a centrifugal oil valve. Thus, in situations in which functioning centrifugal oil compensation is necessary for the precise control of the shifting element, by opening the second centrifugal oil line, the centrifugal oil chamber may be rapidly supplied with operating fluid, and therefore the centrifugal oil chamber may be rapidly filled to a sufficient degree.

The centrifugal oil line is connected to multiple centrifugal oil chambers of multiple shifting elements, in particular multi-plate clutches of the automatic transmission. When reference is made to a centrifugal oil dome below, multiple, or all, centrifugal oil domes of the automatic transmission may also be intended.

The invention is advantageously usable when it may be ensured via suitable measures that the gear shift pressure chamber is always filled with operating fluid. In this case, the risk of the shifting element unintentionally engaging is particularly high. An example of one possible measure is to provide a valve in a discharge outlet of the gear shift pressure chamber that closes the connection to a tank below a definable pressure, for example having a level of 0.2 to 0.4 bar. Thus, in the normal case the pressure in the gear shift pressure chamber does not drop below the definable pressure. Another option is to control a minimum pressure in the gear shift pressure chamber, even when the shifting element is supposed to be disengaged. The mentioned definable pressure and the minimum pressure are selected in such a way that that the shifting element is still reliably completely disengaged when this pressure is applied in the gear shift pressure chamber.

The automatic transmission is designed, for example, as a transmission having multiple coupled planetary sets, and is designed in particular as an automatic transmission corresponding to German patent document DE 10 2008 055 626 A1 by the assignee of the present application. However, the automatic transmission may also be designed, for example, as an automatic gearwheel change transmission, as a dual-clutch transmission, or as a continuously variable transmission.

In one embodiment of the invention, the centrifugal oil valve is designed as a controllable valve, which in a normal position, closes the second supply line. The centrifugal oil valve is designed as a slide valve on the slider of which a control pressure and an elastic force act. In the normal position, in which no control pressure acts on the centrifugal oil valve, the spring presses the slider into a position in which it closes the second supply line. Simple control of the centrifugal oil valve is possible in this way. The control pressure is set, for example, by a pilot valve. The pilot valve is designed, for example, as a solenoid control valve, in particular as a so-called direct control valve. The pilot valve is supplied with a supply pressure, for example in the form of a working pressure or a valve supply pressure, from which the pilot valve derives a desired pilot pressure corresponding to the control by an electronic transmission controller.

In one embodiment of the invention, hydraulic elements for setting flow rates of the operating fluid are situated in the first and/or the second supply line. The mentioned hydraulic elements are designed as throttles. Flow rates of the operating fluid in the first and second supply lines may advantageously be influenced and set using the mentioned hydraulic elements. It may thus be ensured that an excessive amount of operating fluid does not flow via the second supply line to the centrifugal oil chamber, so that the first supply line, and thus components that are supplied by the first supply line, are undersupplied.

In one embodiment of the invention, the first supply line is connected to the centrifugal oil valve via two connections or sections. One of the connections or a section may be blocked by means of the centrifugal oil valve so that no operating fluid is able to flow into the first supply line via this connection or this section. The one connection or section is blocked in particular when the centrifugal oil valve opens the second supply line. The flow rate and the pressure in the first supply line may thus be changed by the centrifugal oil valve.

This is particularly important when, due to multi-purpose use of the control pressure for the centrifugal oil valve together with control of the centrifugal oil valve, a pressure upstream from the centrifugal oil valve is increased at the same time, and a component, for example a hydrodynamic torque converter, whose supply pressure is not allowed to exceed a pressure limit is situated in the first supply line. In this case, a throttle on the centrifugal oil valve may be situated in the non-blockable connection of the first supply line, by means of which the pressure in the first supply line may be limited when the pressure upstream from the centrifugal oil valve increases.

The invention is advantageously usable when a hydrodynamic torque converter and/or a transmission fluid cooler and/or branches in lubricating oil lines is/are situated in the first supply line. Components of the automatic transmission, such as plates of multi-plate clutches, gearwheels, or bearings are lubricated and/or cooled via the lubricating oil lines.

In one embodiment of the invention, the hydraulic controller has a pilot valve and a first and a third valve unit. A pilot pressure set by means of the pilot valve is conductable as control pressure to the first and third valve units and to the centrifugal oil valve as the second valve unit. By means of a counterpressure line, a counterpressure acting against the control pressure may be applied to the third valve unit, and actuation of the third valve unit may thus be prevented.

The valve units are designed as slide valves, for example as shift valves or control slide valves.

An actuation of the third valve unit is understood to mean a change in a switch position of the third valve unit or a change in a pressure or flow rate set by the third valve unit.

The third valve unit is designed as a shift valve, on the slider of which the pilot pressure may act as control pressure on one side, and the counterpressure may act on an opposite side of the slider. In addition, the third valve unit has a spring that is able to apply a force on the slider which acts against the pilot pressure. By an appropriate design of the effective surfaces on the slider, the pressure ranges of the pilot pressure and the counterpressure, and optionally the spring, it may be ensured that an actuation of the valve unit may be prevented by applying a counterpressure to the third valve unit. In this case, an actuation of the valve unit is understood to mean the change in the switch position of the switching valve.

In one embodiment of the invention, for actuating the first valve unit, in each case a first, second, and third pressure range is provided to the centrifugal oil valve as the second valve unit, and to the third valve unit. In this regard, a switching valve is understood to mean that changes in the state or the behavior of the switching valve result from changes in the control pressure within the pressure range associated with the switching valve. A change in the switch position of the shift valve is achieved due to a change in the control pressure from one limit to another limit of the pressure range. An increase of the control pressure above an upper limit, or a decrease below a lower limit, of the particular associated pressure range then has no further effect on the switch position of the shift valve. For a valve unit designed as a control slide valve, the adjusted pressure or the flow rate changes in the event of changes within the pressure range. However, it is also possible for the control pressure to still have an influence on the adjusted pressure or the flow rate for the case in which the control pressure is outside the associated pressure range. The pressure ranges may overlap, but it is also possible for there to be a range in each case between the pressure ranges that is not associated with any of the pressure ranges. The first, second, and third pressure ranges are present one after the other in the order of increasing pressure. For example, a pressure range of approximately 0 to 3 bar is associated with the first valve unit, a pressure range of 4 to 5 bar is associated with the centrifugal oil valve, and a pressure range of 6 to 8 bar is associated with the third valve unit.

Due to the counterpressure on the third valve unit, an actuation of the third valve unit during an intentional actuation of the centrifugal oil valve may be reliably avoided. In fact, this should not occur at all on account of the distribution of the pressure ranges. However, component tolerances or wear or aging of the hydraulic components may result in shifting and/or overlapping of the pressure ranges, and thus, unintentional actuation of the third valve unit. Reliable operation of the hydraulic controller may be made possible by applying the counterpressure to the third valve unit.

However, it is also possible for the third pressure range to be present between the first and the second pressure range. For example, a pressure range of approximately 0 to 3 bar is associated with the first valve unit, a pressure range of 4 to 5 bar is associated with the third valve unit, and a pressure range of 6 to 8 bar is associated with the centrifugal oil valve.

As a result of preventing the actuation of the third valve unit due to the counterpressure, the first or second valve unit may be controlled without the control having effects on the third valve unit. In the mentioned example, the centrifugal oil valve may be controlled without the third valve unit being actuated. The centrifugal oil valve and the third valve unit may thus be independently controlled by only one pilot valve.

In one embodiment of the invention, the counterpressure that may act on the third valve unit, against the control pressure, is derived from a pressure that primarily performs some other function. The term "primarily performs some other function" should be understood to mean that this pressure is not primarily set for deriving the counterpressure therefrom. The mentioned pressure is set, for example, in order to control a further valve unit, or in particular to actuate a shifting element of the automatic transmission, for example in the form of a multi-plate clutch or multi-plate brake. The pressure from which the counterpressure is derived is selected in such a way that in situations in which control of the centrifugal oil valve is meaningful or necessary, the counterpressure is high enough to prevent unintentional actuation of the third valve unit.

In one embodiment of the invention, the hydraulic controller has a shuttle valve by means of which the counterpressure may be derived from a first pressure or from a second pressure. The shuttle valve is designed as an automatically switching valve that derives the counterpressure from the higher of the two mentioned pressures. The shuttle valve is designed as a ball shuttle valve. The actuation of the third valve unit may thus be prevented not only as a function of one pressure, but, rather, as a function of two pressures. Thus, control of the second valve unit without effects on the third valve unit is possible in very many situations.

In one embodiment of the invention, the counterpressure is derived from a pressure of an actuating system of a shifting element of the automatic transmission. The control of the centrifugal oil valve may thus be made possible without effects on the third valve unit when the automatic transmission is engaged in certain gears, and thus, when certain shifting elements are actuated. The rapid filling of one or more centrifugal oil domes is usually necessary only for certain shifting operations within the automatic transmission. Which shifting operations are affected depends on the design of the automatic transmission. For example, there may be shifting in which a shifting element in the form of a multi-plate clutch is accelerated very strongly, but must remain engaged. If the centrifugal oil dome is not sufficiently filled, as described above this may result in unintentional engagement of the shifting element. If the counterpressure is derived from an actuating pressure of a shifting element, gears may be determined in which control of the centrifugal oil valve is possible without actuating the third valve unit. If an above-described shuttle valve which may switch between two actuating pressures of two different shifting elements is additionally used, a sufficiently high actuating pressure is available in a plurality of gears.

The invention is advantageously usable when the first valve unit is provided for setting a lubricant pressure, and the third valve unit is associated with a parking lock actuating system.

The first valve unit is designed in such a way that an increase in control pressure causes an increase in lubricant pressure. In the above-mentioned example of the pressure ranges associated with the valve units, this means that a high lubricant pressure is set for controlling the parking lock actuating system or the centrifugal oil valve.

A parking lock of the parking lock actuating system must be actuated, in particular engaged, only when the automatic transmission is not in gear. Therefore, this does not represent any functional limitation for the parking lock actuating system when actuation of the parking lock is not possible in some gears on account of the counterpressure. On the other hand, filling of the centrifugal oil domes is necessary only when the automatic transmission is engaged in certain gears. The parking lock is actuated only when the automatic transmission is not in gear. Thus, the centrifugal oil valve may be controlled in all necessary situations. Actuation of the parking lock actuating system and of the centrifugal oil valve by a shared solenoid control valve does not limit the functionalities of the two systems.

Further advantages, features, and particulars of the invention result from the following description of exemplary embodiments and with reference to the drawings, in which identical or functionally equivalent elements are provided with identical reference numerals.

BRIEF DESCRIPTION OF THE DRAWING FIGURE

The sole FIGURE shows the following:

FIG. 1 shows a hydraulic diagram of a hydraulic controller of an automatic transmission.

DETAILED DESCRIPTION

According to FIG. 1, a hydraulic controller for an automatic transmission of a motor vehicle has a main pump 10 driven by an internal combustion engine 11. The main pump 10 draws in operating fluid in the form of transmission fluid from a tank 13 via a suction filter 12. Outlets to a tank at multiple points are illustrated in FIG. 1. This is understood to mean that transmission fluid from these outlets directly or indirectly reaches the tank 13. The main pump 10 conveys transmission fluid into a working pressure line 14, which supplies a working pressure slide valve 15 with transmission fluid. Situated in the working pressure line 14 is a check valve 16 which is designed in such a way that transmission fluid is able to flow from the main pump 10 to the working pressure slide valve 15, but not vice versa.

The working pressure slide valve 15 is designed as a control slide valve of standard design, on which a pressure set as control pressure by a working pressure solenoid control valve 17 acts. Together with an elastic force that sets a baseline pressure of the working pressure, the control pressure acts against the working pressure returned from the working pressure line 14. The level of the working pressure may be adjusted by changing the pressure set by the working pressure solenoid control valve 17. When the working pressure reaches the setpoint value set by the working pressure solenoid control valve 17, the working pressure slide valve 15 establishes a connection between the working pressure line 14 and a lubricant pressure slide valve 19 via a lubricant pressure line 18. Thus, the lubricant pressure slide valve 19 is supplied with transmission fluid only when the working pressure has reached its setpoint value set by the working pressure solenoid control valve 17. The working pressure slide valve 15 thus regulates the working pressure in the working pressure line 14 to the setpoint value set by the working pressure solenoid control valve 17.

The lubricant pressure slide valve 19 is likewise designed as a control slide valve of standard design, on which the pressure set as control pressure by a lubricant pressure solenoid control valve 20 acts. The lubricant pressure solenoid control valve 20 may thus be referred to as a pilot valve. Together with an elastic force that sets a baseline pressure of the lubricant pressure, the lubricant pressure acts against the lubricant pressure returned from the lubricant pressure line 18. The level of the lubricant pressure may be adjusted by changing the pressure set by the lubricant pressure solenoid control valve 20. When the lubricant pressure reaches the set setpoint value, the pressure valve 19 establishes a connection between the lubricant pressure line 18 and a return line 21. Transmission fluid is returned via the return line 21 to an intake line 22, which connects the main pump 10 to the suction filter 12. The lubricant pressure slide valve 19 thus adjusts the lubricant pressure in the lubricant pressure line to the setpoint value set by the lubricant pressure solenoid control valve 20. The lubricant pressure slide valve 19 is designed in such a way that the maximum required lubricant pressure is achieved with a control pressure of approximately 3 bar. A pressure range of 0 to 3 bar is thus associated with the lubricant pressure slide valve. If the control pressure further increases, the set lubricant pressure also further increases.

The working pressure solenoid control valve 17 and the lubricant pressure solenoid control valve 20 are both designed as so-called direct control valves. In direct control valves, a force of an electromagnet, which is controlled by an electronic control device (not illustrated), acts directly on a slider as a control force. An elastic force and a returned pressure, whose level is to be set by the direct control valve corresponding to the control by the electronic control device, acts against the control force. The pressure set by a direct control valve is derived from a supply pressure. In the case of the working pressure solenoid control valve 17 and the lubricant pressure solenoid control valve 20, the working pressure in the working pressure line 14 is used as supply pressure.

The hydraulic controller may also have a connection, not illustrated, via which a controllable torque distribution device for an all-wheel drive of the motor vehicle may be supplied with working pressure.

In addition to the main pump 10, the hydraulic controller has an auxiliary pump 23, which may be driven by an electric motor 24 controlled by the electronic control device. The auxiliary pump 23 may on the one hand assist the main pump 10 in situations in which the delivery rate of the main pump 10 is insufficient, a maximum achievable pressure of the auxiliary pump 23 being much lower than a maximum pressure of the main pump 10. On the other hand, the auxiliary pump 23 may ensure a baseline supply of the hydraulic controller when the internal combustion engine 11 is at a standstill, and therefore the main pump 10 is stopped. The auxiliary pump 23 likewise draws in transmission fluid from the tank 13 via the suction filter 12. The auxiliary pump conveys transmission fluid into an auxiliary pump line 25, which is connected to the working pressure line 14 via a check valve 26. The check valve 26 is situated in such a way that transmission fluid is able to flow from the auxiliary pump line 25 into the working pressure line 14, but not vice versa. Thus, in the case in which the working pressure is less than the maximum achievable pressure of the auxiliary pump, the auxiliary pump 23 together with the main pump 10 may convey into the working pressure line 14. The auxiliary pump line 25 is also connected to an auxiliary pump slide valve 27. A connection between the auxiliary pump line 25 and the lubricant pressure line 18 may be established by means of the auxiliary pump slide valve 27, a check valve 28 being situated between the auxiliary pump slide valve 27 and the lubricant pressure line 18 in such a way that transmission fluid is able to flow from the auxiliary pump slide valve 27 into the lubricant pressure line 18, but not vice versa. The mentioned connection between the auxiliary pump line 25 and the lubricant pressure line 18 is interrupted in an illustrated normal position of the auxiliary pump slide valve 27, and the mentioned connection is established in a connected position of the auxiliary pump slide valve 27. The working pressure in the working pressure line 14 acts as control pressure on the auxiliary pump slide valve 27, against an elastic force. The elastic force is designed in such a way that the auxiliary pump slide valve 27 remains in the normal position until the working pressure exceeds the maximum achievable pressure of the auxiliary pump 23. When this pressure is reached, the connection between the auxiliary pump line 25 and the lubricant pressure line 18 is established via the auxiliary pump slide valve 27, and the auxiliary pump 23 may convey transmission fluid into the lubricant pressure line 18, in which a pressure prevails that is much lower than the working pressure. Thus, the auxiliary oil pump 23 may then also assist the main pump 10 when the working pressure is greater than the maximum achievable pressure of the main pump, which therefore is no longer able to convey into the working pressure line 14.

Solenoid control valves 29, 30, 31, 32, 33, and 34 for actuating shifting elements of the automatic transmission in the form of multi-plate clutches and multi-plate brakes are also supplied with working pressure via the working pressure line 14. The multi-plate clutches and multi-plate brakes are schematically illustrated by gear shift piston-cylinder units 35, 36, 37, 38, 39, and 40, by means of which the multi-plate clutches and multi-plate brakes may be engaged and disengaged. The gear shift piston-cylinder units 35, 38, and 40 are associated with multi-plate brakes, and the gear shift piston-cylinder units 36, 37, and 39 are associated with multi-plate clutches. The solenoid control valves 29, 30, 31, 32, 33, and 34 have an identical design, so that only the solenoid control valve 29 is explained in greater detail. The solenoid control valve 29 is likewise designed as a direct control valve that is controlled by the electronic control device, not illustrated. The solenoid control valve 29 is supplied with working pressure via a connection. The solenoid control valve is used for setting an actuating pressure in a gear shift pressure chamber 41 of the gear shift piston-cylinder unit 35, to which the solenoid control valve is connected via a line 42. The actuating pressure in the line 42 is returned to the solenoid control valve 29 as control pressure. To avoid pressure fluctuations in the line 42, the actuating pressure is also returned to two further connections of the solenoid control valve 29. The line 42 is connected via the solenoid control valve 29 to a pressure store 43 as a further measure for avoiding pressure fluctuations. The solenoid control valve 29 and also the solenoid control valves 30, 31, 32, 33, and 34 are connected to the tank 13 via a tank discharge line 87. A spring-loaded check valve 44 is situated in the tank discharge line 87. The check valve 44 is situated in such a way that transmission fluid may flow into the tank 13. The check valve is also designed in such a way that it opens the flow in the direction of the tank 13 only when a minimum pressure of 0.2 to 0.4 bar, for example, prevails in the tank discharge line 87. It is thus ensured that at least the mentioned minimum pressure is always present in the tank discharge line 87. As a result, the line 42 and the gear shift pressure chamber 41 are not able to run dry, but instead are always filled with transmission fluid.

Thus, by appropriate control of the solenoid control valve 29, an actuating pressure may be built up and relieved in the gear shift pressure chamber of the gear shift piston-cylinder unit 35, and thus, the multi-plate brake associated with the gear shift piston-cylinder unit 35 may be engaged and disengaged. By appropriate control of the solenoid control valves 29, 30, 31, 32, 33, and 34, the multi-plate clutches and multi-plate brakes of the automatic transmission may thus be engaged and disengaged, thus engaging and disengaging the individual gears. The solenoid control valves 29, 30, 31, 32, 33, and 34 and the gear shift piston-cylinder units 35, 36, 37, 38, 39, and 40 may thus be referred to as a gear shifting system 61. A total of nine forward gears and one reverse gear may be shifted using the gear shifting system 61 illustrated here.

The lubricant pressure line 18 is connected to a converter inlet 46 of a hydrodynamic torque converter 47 via a centrifugal oil valve 45, which is designed as a controllable shift valve, and a first supply line 63. The pressure which is set by the lubricant pressure solenoid control valve 20 acts as control pressure on the centrifugal oil valve 45, against an elastic force. The elastic force is designed in such a way that the centrifugal oil valve 45 changes from an illustrated normal position into a switch position when a pressure limit of 4 bar, for example, is exceeded. The pressure set by the lubricant pressure solenoid control valve 20 thus acts as control pressure on the lubricant pressure slide valve 19 and also on the centrifugal oil valve 45. A pressure range of 3 to 5 bar is thus associated with the centrifugal oil valve 45.

In the illustrated normal position of the centrifugal oil valve 45, the lubricant pressure line 18 is connected to the converter inlet 46 via the centrifugal oil valve 45 by means of two connections. A flow rate setting element 49 is situated in a first section 48 of the first supply line 63 between the centrifugal oil valve 45 and the converter inlet 46, and no corresponding hydraulic component is situated in a second section 50 extending parallel to the first section 48. The second section 50 is connected to the lubricant pressure line 18 only in the normal position of the centrifugal oil valve 45. In contrast, the first section 48 is always connected to the lubricant pressure line 18. As a result, in the switch position of the centrifugal oil valve 45, in which a very high lubricant pressure acts as described above, the pressure at the converter inlet 46 via the flow rate setting element 49 is lowered enough that damage to the torque converter 47 is reliably avoided.

After flowing through the torque converter 47, the transmission fluid flows through a converter outlet 51 to a transmission fluid cooler 52. Various lubrication points 53 in the automatic transmission are supplied with cooled transmission fluid from the transmission fluid cooler 52.

The torque converter 47 has a lockup clutch 54 that is controlled by a solenoid control valve converter 55. For this purpose, the solenoid control valve converter 55 sets an actuating pressure in a line 56 connected to a pressure chamber, not illustrated, of the lockup clutch 54 corresponding to control by the electronic control device. The torque converter 47 is thus designed as a so-called three-channel converter. The solenoid control valve converter 55 is likewise designed as a direct control valve and is supplied with working pressure. As a special feature, the solenoid control valve converter 55 as a pilot control is supplied with a pressure corresponding to an internal pressure of the torque converter 47 that acts on the lockup clutch 54, against the actuating pressure. The mentioned pressure acts in the same direction as the force of the electromagnet of the solenoid control valve converter 55, and is tapped in a line 58, which is connected to the converter inlet 46 via a first flow rate setting element 59 and is connected to the converter outlet 51 via a second flow rate setting element 60. With a suitable selection of the flow rate setting elements 59 and 60, the pressure in the line 58 corresponds to the internal pressure of the torque converter 47. The method of operation of the return and discharge of the internal pressure is described in detail in German patent document DE 10 2004 012 117 A1.

The gear shift piston-cylinder units 36, 37, and 39 of the multi-plate clutches each have a centrifugal oil chamber 62, which, via a centrifugal oil line 64, is connected to the transmission cooler 52, and thus connected, at least indirectly, to the first supply line 63. The centrifugal oil chamber 62 is situated opposite from the gear shift pressure chamber 41 with respect to a gear shift piston 65 which acts on the multi-plate clutches. Provided that the centrifugal oil chamber 62 is filled with sufficient transmission fluid, the pressure increases in the gear shift pressure chamber 41 and in the centrifugal oil chamber 62 which arise due to rotation of the gear shift piston-cylinder units 36, 37, and 39 offset one another.

In some situations, for example for certain shifting operations in the automatic transmission, functioning centrifugal oil compensation, i.e., sufficiently filled centrifugal oil chambers 62, is important. In these situations, the centrifugal oil valve 45 may be brought into its switch position, as described above, via a corresponding pressure of the lubricant pressure solenoid control valve 20. In this switch position, a connection between the lubricating oil line 18 and a second supply line 66, which opens into the centrifugal oil line 64, is established via the centrifugal oil valve 45. The centrifugal oil line 64 is thus supplied with transmission fluid not only via the first supply line 63, but also via the second supply line 66. In this way, the centrifugal oil chambers 62 of the gear shift piston-cylinder units 36, 37, and 39 may be filled very rapidly, and thus, functioning centrifugal oil compensation may be achieved.

A flow rate setting element 67 is situated in the second supply line 66. Flow rates of the transmission fluid into the first and second supply lines 63, 66, respectively, may be set via this flow rate setting element 67 and the flow rate setting element 49 in the first section 48 of the first supply line 63. A check valve may be situated in the centrifugal oil line 64 in such a way that return flow of transmission fluid from the second supply line 66 in the direction of the transmission cooler 52 is prevented.

The hydraulic controller also has a parking lock actuating system 68 by means of which a parking lock, not illustrated, may be engaged and disengaged. The parking lock actuating system 68 has a parking lock piston-cylinder unit 69 having a parking lock piston 70 that is at least indirectly connected to a so-called parking lock pawl, not illustrated. The parking lock is disengaged by displacement of the parking lock piston 70 in a first activation direction 71, and is engaged by displacement in a second activation direction 72 that is opposite from the first activation direction 71. When the parking lock is engaged, this position is referred to below as the P position, and when the parking lock is not engaged, this position is referred to as the non-P position. The parking lock piston-cylinder unit 69 has a first parking lock pressure chamber 73. The parking lock piston 70 may be moved in the non-P direction (first activation direction 71) by supplying transmission fluid into the first parking lock pressure chamber 73. The parking lock piston-cylinder unit 69 has a second parking lock pressure chamber 74 on a side opposite from the first parking lock pressure chamber 73 with respect to the parking lock piston 70. The parking lock piston 70 may be moved in the P direction (second activation direction 72) by supplying transmission fluid into the second parking lock pressure chamber 74. The parking lock piston-cylinder unit 69 also has a parking lock 75 situated in such a way that it applies an elastic force on the parking lock piston 70 in the P direction.

The parking lock piston-cylinder unit 69 also has a controllable detent mechanism 76 by means of which a position of the parking lock piston 70 may be established. For this purpose, the detent mechanism 76 has a solenoid 77 controlled by the electronic control device and which may engage with a contour 78 of a piston rod 79 connected to the parking lock piston 70. The detent mechanism 76 is designed in such a way that it may be overpressured in the P direction. For this purpose, the mentioned contour 78 is designed in such a way that it is able to push the solenoid 77 back in the P direction when the parking lock piston 70 is moved. In contrast, overpressuring of the detent mechanism 76 in the non-P direction is not possible.

Transmission fluid may be supplied into the second parking lock pressure chamber 74 via a parking lock slide valve 80 that is supplied with working pressure, so that an actuating force in the P direction may be applied in addition to the force of the parking lock spring 75. The parking lock slide valve 80 is designed as a shift valve having two positions. In a P position, which is not illustrated, the working pressure line 14 is connected to the second parking lock pressure chamber 74 via the parking lock slide valve 80, so that transmission fluid is supplied to the second parking lock pressure chamber.

When the parking lock piston 70 is moved in the P direction, transmission fluid must be discharged from the first parking lock pressure chamber 73. So that this is possible in a rapid manner and with only slight resistance, the parking lock actuating system 68 has a drain slide valve 81, designed as a shift valve having two positions with large flow rate cross sections, which is connected to the first parking lock pressure chamber 73. In an illustrated emptying position, the first parking lock pressure chamber 73 is connected to the tank 13 via the drain slide valve 81. As a result, the transmission fluid does not have to be discharged into the tank 13 from the first parking lock pressure chamber 73 via the parking lock slide valve 80, which has much smaller flow rate cross sections, but instead may drain into the tank 13 via the drain slide valve 81 without high resistance. In a filling position, not illustrated, of the drain slide valve 81, a parking lock connecting line 82 that establishes a connection of the parking lock slide valve 80 to the drain slide valve 81 is connected to the first parking lock pressure chamber 73 via the drain slide valve 81. Thus, transmission fluid may be supplied to the first parking lock pressure chamber 73 in the filling position of the drain slide valve 81, and the parking lock piston 70 may be displaced in the non-P direction. The pressure in the parking lock connecting line 82, which acts against an elastic force of a drain spring 83, acts as control pressure for the switchover between the filling position and the emptying position of the drain slide valve 81. The drain slide valve 81 is designed in such a way that it may be brought into the emptying position by the elastic force of the drain spring 83, which thus represents the normal position of the drain slide valve.

The parking lock connecting line 82 may be connected to the working pressure line 14 via the parking lock slide valve 80. The parking lock slide valve 80 is then in an illustrated non-P position. The drain slide valve 81 is initially still in the emptying position, in which it closes off the parking lock connecting line 82 to the extent that a pressure may build up in the parking lock connecting line 82. Thus, the working pressure, which then also acts as control pressure on the drain slide valve 81 and brings same into the filling position against the elastic force, then acts in the parking lock connecting line 82. When the working pressure is sufficiently high, transmission fluid is thus supplied to the first parking lock pressure chamber 73 and the parking lock is disengaged, provided that the detent mechanism is deactivated, i.e., the solenoid 77 is not engaged with the contour 78. For this purpose, transmission fluid must be able to discharge from the second parking lock pressure chamber 74 into the tank 13, for which reason the second parking lock pressure chamber 74 is connected to the tank 13 via the parking lock slide valve 80 in the non-P position of the parking lock slide valve 80.

The pressure set by the lubricant pressure solenoid control valve 20 acts as control pressure on the parking lock slide valve 80, against an elastic force of a parking lock slide valve spring 84. This pressure thus acts as control pressure on the lubricant pressure slide valve 19 as the first valve unit, on the centrifugal oil valve 45 as the second valve unit, and on the parking lock slide valve 80 as the third valve unit. The parking lock slide valve spring 84 is situated in such a way that it may bring the parking lock slide valve 80 into the non-P position, which thus represents the normal position of the parking lock slide valve 80. The parking lock slide valve 80 is designed in such a way that when no further pressures act on it, it assumes the P position at or above a control pressure of approximately 7 bar. Since the lubricant pressure solenoid control valve 20 is able to set a maximum pressure of 8 bar, a pressure range of 6 to 8 bar is thus associated with the parking lock slide valve 80.

The parking lock slide valve 80 is also connected to a counterpressure line 85 in such a way that a pressure acting in the same direction as the elastic force of the parking lock slide valve spring 84 is able to act in the counterpressure line 85 as counterpressure against the control pressure. Thus, when the counterpressure is appropriately high, the parking lock slide valve 80 also then remains in the non-P position when a control pressure is set in which the centrifugal oil valve 45 is in its switch position in which rapid filling of the centrifugal oil dome 62 is possible. This may be ensured even if the mentioned pressure ranges have shifted and overlap due to tolerances, wear, or aging. The counterpressure line 85 is connected via a ball shuttle valve 86 to the gear shift pressure chambers 41 of the gear shift piston-cylinder units 37 and 39. The ball shuttle valve 86 is situated in such a way that the higher of the two pressures in the mentioned pressure chambers 41 acts as counterpressure on the parking lock slide valve 80. If one of the two multi-plate clutches associated with the gear shift piston-cylinder units 37 and 39 is actuated and thus engaged, the counterpressure is high enough to prevent the change of the parking lock slide valve 80 into the P position. The hydraulic controller is designed in such a way that one of the two clutches is engaged in all gears in which control of the centrifugal oil valve 45 may be necessary.

The parking lock spring 75 is utilized in order to engage the parking lock when there is very little or no working pressure, for example when the internal combustion engine 11 is at a standstill and the main pump 10 is thus stopped. To this end, the solenoid 77 and therefore the detent mechanism 76 are deactivated, and the parking lock spring 75 is able to move the parking lock piston 70 in the direction of the P position. In the process, transmission fluid must be discharged from the first parking lock pressure chamber 73. Since very little or no working pressure is available, the parking lock slide valve 80 is in its normal position. Thus, the parking lock slide valve cannot be brought into the P position, and instead is in the non-P position. In the non-P position of the parking lock slide valve 80 there is no connection between the parking lock connecting line 82 and the tank 13 via the parking lock slide valve 80, except via the slider gaps. The transmission fluid would therefore be able to discharge only very slowly in the direction of the tank 13 via the parking lock slide valve 80. Since in this case there is also little or no pressure prevailing in the parking lock connecting line 82, the drain slide valve 81 is in its emptying position as described above. Thus, the transmission fluid may be discharged very rapidly to the tank 13 from the first parking lock pressure chamber 73 via the drain slide valve 81, and the parking lock may be engaged.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:
1. A hydraulic controller and automatic transmission system of a motor vehicle, comprising:
   a gear shifting system that includes at least one gear shift piston-cylinder unit having a gear shift piston configured to actuate a shifting element;
   a gear shift pressure chamber configured such that an actuating pressure is built up in the gear shift pressure chamber;
   a centrifugal oil chamber separated from the gear shift pressure chamber by the gear shift piston, wherein the centrifugal oil chamber is configured to be supplied with operating fluid via a centrifugal oil line provided by a first supply line;
   a hydrodynamic torque converter situated in the first supply line;
   a second supply line configured to supply operating fluid to the centrifugal oil line, wherein the second supply line is configured to be closed and opened by a centrifugal oil valve; and hydraulic elements configured to set flow rates of the operating fluid, one of the hydraulic elements situated in the first supply line and avoiding excessive flow of operating fluid to the centrifugal oil chamber;

wherein one other of the hydraulic elements is situated in the second supply line; and wherein the first supply line is connected to the centrifugal oil valve via two supply line sections, with one of the two supply line sections being blockable by the centrifugal oil valve and both of the supply line sections leading to the hydrodynamic torque converter.

2. The system according to claim 1, wherein the centrifugal oil valve is configured such that in a normal position the centrifugal oil valve closes the second supply line.

3. The system according to claim 1, further comprising:
a pilot valve, a first slide valve, and a second slide valve, wherein a pilot pressure set by means of the pilot valve is conductable to control the first and second slide valves and to the centrifugal oil valve, and by means of a counterpressure line, a counterpressure acting against the pilot pressure is applied to the second side valve, which prevents actuation of the second side valve.

4. The system according to claim 3, wherein the counterpressure is derived from a pressure that primarily performs some other function.

5. The system according to claim 4, further comprising:
a shuttle valve configured such that the counterpressure is derived from a first pressure or from a second pressure.

6. The system according to claim 4, wherein the counterpressure is derived from an actuating pressure of a shifting element of the automatic transmission.

* * * * *